(12) United States Patent
Ross et al.

(10) Patent No.: US 12,071,226 B2
(45) Date of Patent: Aug. 27, 2024

(54) VERTICAL TAKE OFF AND LANDING VEHICLE

(71) Applicant: PAL-V IP B.V., Raamsdonksveer (NL)

(72) Inventors: Edwin Anton Ross, Raamsdonksveer (NL); Hans Joore, Oosterhout (NL); Michael Alwin William Stekelenburg, Vught (NL); Lourens Jacobus Dingemanse, Raamsdonksveer (NL)

(73) Assignee: PAL-V IP B.V., Raamsdonksveer (NL)

(*) Notice: Subject to any disclaimer, the term of this patent is extended or adjusted under 35 U.S.C. 154(b) by 294 days.

(21) Appl. No.: 17/436,140

(22) PCT Filed: Mar. 4, 2020

(86) PCT No.: PCT/NL2020/000004
§ 371 (c)(1),
(2) Date: Sep. 3, 2021

(87) PCT Pub. No.: WO2020/180173
PCT Pub. Date: Sep. 10, 2020

(65) Prior Publication Data
US 2022/0144417 A1 May 12, 2022

(30) Foreign Application Priority Data
Mar. 4, 2019 (NL) .................................... 1043177

(51) Int. Cl.
*B64C 27/82* (2006.01)
*B64C 27/06* (2006.01)

(52) U.S. Cl.
CPC .............. *B64C 27/06* (2013.01); *B64C 27/82* (2013.01); *B64C 2027/8227* (2013.01);
(Continued)

(58) Field of Classification Search
CPC ..... B64C 27/26; B64C 27/82; B64C 27/8227; B64C 27/8254; B64C 27/829;
(Continued)

(56) References Cited

U.S. PATENT DOCUMENTS 2,369,652 A * 2/1945 Avery ..................... B64C 27/82
244/76 R
3,105,659 A * 10/1963 Stutz ....................... B64C 27/32
416/123
(Continued)

FOREIGN PATENT DOCUMENTS

AT 510341 A1 * 3/2012 ............. B64C 27/26
AT 510341 3/2021
(Continued)

OTHER PUBLICATIONS

International Search Report and Written Opinion from Application No. PCT/NL2020/000004 dated May 15, 2020.
(Continued)

*Primary Examiner* — Philip J Bonzell
(74) *Attorney, Agent, or Firm* — Troutman Pepper Hamilton Sanders LLP; Ryan A. Schneider; Korbin M. Blunck

(57) ABSTRACT

A flying passenger rotor lifted vehicle that is capable of taking off and landing vertically, that is relatively lightweight, has responsive control, and increased safety against failure of propulsion/thrust systems. The flying vehicle can include a body having a tail section, a central thrust unit arranged along the longitudinal axis of the vehicle, at a distance from the rotation axis of the main rotor, a mounting support on either side of the body, and a side thrust unit mounted to each mounting support. The central thrust unit includes a fan which provides air flow with a flow component perpendicular to a virtual vertical midplane of the vehicle. Each of the side thrust units includes a fan which
(Continued)

provides air flow with a flow component parallel to the virtual vertical midplane. At least one of the thrust units has controllable air deflection to deflect the corresponding output air flow in a controllable manner.

1 Claim, 2 Drawing Sheets

(52) U.S. Cl.
CPC ............... *B64C 2027/8254* (2013.01); *B64C 2027/8272* (2013.01); *B64C 2027/829* (2013.01)

(58) Field of Classification Search
CPC .... B64C 2027/8227; B64C 2027/8254; B64C 2027/829; B64C 11/001; B64C 27/22; B64C 2027/8236
See application file for complete search history.

(56) References Cited

U.S. PATENT DOCUMENTS

| | | | | |
|---|---|---|---|---|
| 3,698,666 | A * | 10/1972 | Monti | B64C 27/26 244/7 A |
| 9,321,526 | B2 * | 4/2016 | Fink | B64C 39/068 |
| 9,611,037 | B1 | 4/2017 | Groen | |
| 10,005,550 | B2 * | 6/2018 | Toulmay | B64C 27/82 |
| 10,131,424 | B2 * | 11/2018 | Fink | B64C 25/10 |
| 11,148,792 | B2 * | 10/2021 | Blacha | B64C 27/26 |
| 11,292,589 | B2 * | 4/2022 | Eglin | B64C 27/57 |
| 11,480,429 | B2 * | 10/2022 | Abdelli | G08G 5/0065 |
| 11,701,973 | B2 * | 7/2023 | Tomonaga | B60L 50/60 244/2 |
| 11,718,390 | B2 * | 8/2023 | Sinusas | B64C 27/20 244/17.21 |
| 2004/0026563 | A1 * | 2/2004 | Moller | B64C 11/48 244/12.4 |
| 2009/0014580 | A1 * | 1/2009 | Piasecki | B64C 27/28 244/17.19 |
| 2014/0061367 | A1 * | 3/2014 | Fink | B64C 27/26 244/6 |
| 2017/0113793 | A1 * | 4/2017 | Toulmay | B64C 27/22 |
| 2017/0197709 | A1 * | 7/2017 | Fink | B64C 39/068 |
| 2020/0140072 | A1 * | 5/2020 | Blacha | B64C 27/24 |
| 2020/0150693 | A1 * | 5/2020 | Tomonaga | B60L 50/61 |
| 2020/0217658 | A1 * | 7/2020 | Abdelli | G08G 5/0086 |
| 2021/0031908 | A1 * | 2/2021 | Sinusas | B64C 27/20 |
| 2021/0284331 | A1 * | 9/2021 | Eglin | B64C 27/57 |

FOREIGN PATENT DOCUMENTS

| | | |
|---|---|---|
| GB | 2130984 | 6/1984 |
| GB | 2238995 | 6/1991 |
| GB | 2238996 | 6/1991 |

OTHER PUBLICATIONS

Robb, "Hybrid Helicopters: Compounding the Quest for Speed," Jun. 19, 2006 Vertiflite https://web.archive.org/web/20060927042104if_/http://www.vtol.org/pdf/summer06robb.pdf.

* cited by examiner

VERTICAL TAKE OFF AND LANDING VEHICLE

FIELD OF THE INVENTION

The present invention relates in general to an aircraft or flying machine, capable of taking off and landing vertically, thus able to take off from and land on a relatively small surface area without requiring any length of runway.

BACKGROUND OF THE INVENTION

Vertical Take Off and Landing Vehicles, hereinafter indicated as VTOL vehicles, are known per se. Some are designed on the basis of two thrust-providing jet engines mounted on either side of the body, that can be tilted to provide vertical thrust, such as the AV-8 Harrier Jump Jet. Others examples use the principle of tiltable propellers mounted at the wings, such as the V-22 Osprey.

Another design is based on having one or more lift rotors mounted above the body, such as a helicopter. Suitable control of the rotor blades and/or tilting of the vehicle as a whole will provide horizontal thrust for forward flight.

As regards powering, larger aircraft are invariably powered by fuel. It would be desirable to have the aircraft powered electrically, but the required power is such that the power supply (batteries) would be very heavy for the intended mission profile.

SUMMARY OF THE INVENTION

An object of the present invention is to provide a simplified design for a passenger vehicle that is capable to fly, is relatively light-weight, has responsive control, and increased safety against failure of propulsion/thrust systems, i.e. failure in the thrust generators as well as in their power supplies.

A further object of the present invention is to provide such design suitable for being powered electrically.

The basis of the design presented by the present invention is a rotor-lifted vehicle, i.e. lift is provided by a central rotor. In an embodiment, the vehicle is capable to take off and land vertically, without any horizontal speed being required. In another embodiment, the vehicle is designed according to the principles of a gyrocopter, which does require some horizontal speed on take-off and landing, with the required speed being obtained (take-off) or removed (landing) in a relatively short stretch of runway, typically less than 100 m. The wording "Short TakeOff and Landing", abbreviated as "STOL", will be used as general phrase to cover such and other embodiments.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
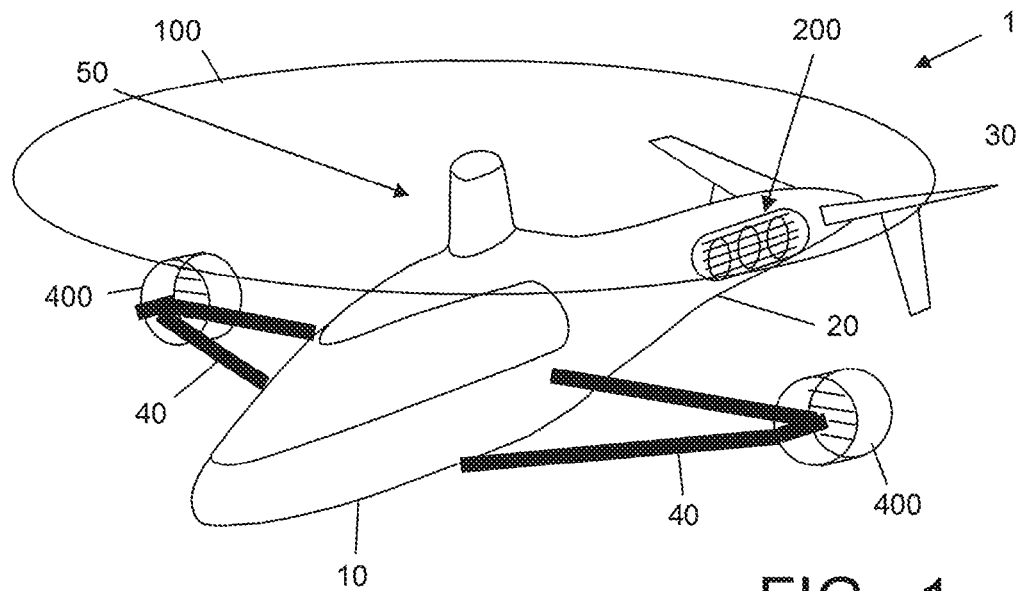
FIG. 1 schematically shows an example of an STOL vehicle according to the present invention.

FIG. 1 schematically shows an STOL vehicle 1 designed according to the present invention. The vehicle 1 comprises a slender body 10 with a tail section 20, defining a longitudinal direction of the vehicle. The tail section 20 is provided with a tail foils structure 30. On each side of the body 10, at least one mounting support 40 is provided. On top of the body 10, a mast 50 is provided, which carries a main rotor 100, having a substantially vertical rotation axis. A virtual vertical midplane of the vehicle is defined by said rotation axis in combination with said longitudinal direction.

Further to the main rotor 100, the vehicle 1 is provided with a central thrust unit 200 arranged in or at the tail section 20, and side thrust units 400 arranged at the mounting supports 40, The vehicle may have more than one mounting support per side, and a mounting support may carry more than one side thrust unit. The main purpose of the mounting supports 40 is to hold the corresponding side thrust unit(s) at some horizontal distance from the body 10, and their precise design is not essential for the present invention. For instance, the mounting supports 40 may consist of tubes. Nevertheless, it is preferred that the mounting supports 40 have an aerodynamic profile, and it may be desirable that the mounting supports 40 are shaped as wings to contribute to lift during flight.

The thrust units 200, 400 will be described in more detail later. At this point, it is noted that the thrust units 200, 400 serve the purpose of providing forces with a horizontal component to counteract the reaction torque provided by the main rotor, and to provide yaw control, and they serve the purpose of providing forces with a vertical component to provide pitch control and roll control. As a result, for manoeuvring the vehicle horizontally, i.e. forward and backward but also sideways, pitch control and roll control can be used to slightly tilt the vertical lift vector provided by the main rotor, while the main rotor itself may have a relatively simple design without cyclic control. Such simple rotor design involves lower costs, including for maintenance, and lower risk of failure. In the most simple embodiment, the rotor blades will have fixed pitch, but it is preferred to have the pitch of the rotor blades to be adjustable collectively in order to (quickly) vary lift.

The main rotor 100 is relatively large, so that the vehicle 1 can hover efficiently. The main rotor 100 may for instance have 2, 3, 4, 5, 6 or even more blades, but increasing number of blades adds to complexity and weight.

The central thrust unit 200 may in principle be located anywhere along the longitudinal axis of the vehicle 1, even at the nose. A relatively large distance to the rotation axis of the main rotor 100 is advantageous, for which reason a location in or at the tail section 20 is preferred. The vehicle may have two or more central thrust units.

A central thrust unit 200 comprises at least one fan having its rotation axis generally perpendicular to said vertical midplane. The precise orientation of the central thrust unit 200 is not crucial for the present invention, and may depend on secondary design considerations, as long as the central thrust unit 200 is in any case capable of providing thrust with a component perpendicular to said vertical midplane.

The vehicle 1 may comprise a group of more than one central thrust units 200. In such case, the respective fans may be aligned in linear fashion, with their rotation axes arranged in a common virtual plane, which may be horizontal or sloping in longitudinal direction of the vehicle 1. Three fans may for instance be arranged in a triangular configuration.

The vehicle 1 may comprise at least one central thrust unit 200 in front of the main rotor 100 and at least one central thrust unit 200 at the rear of the main rotor 100.

Each side thrust unit 400 is preferably mounted at the distal end of the corresponding support 40. The precise length of the support 40 is not essential for the present invention; in general, in may be considered that a longer support provides a longer arm for the force vectors of the side thrust unit 400, and also provides more lift when wing-shaped, but also entails more drag.

A side thrust unit 400 comprises at least one fan having its rotation axis generally parallel to said vertical midplane. The precise orientation of the side thrust unit 400 is not crucial for the present invention, and may depend on secondary design considerations, as long as the side thrust unit 400 is in any case capable of providing thrust with a component generally parallel to said vertical midplane. It may be that the side thrust unit 400 is positionally fixated such that thirst is always provided with a generally horizontal component. It may be that the side thrust unit 400 is tiltable about an axis generally perpendicular to said vertical midplane; in such case, the tilting range includes an operational position in which thrust with a generally horizontal component is provided.

Figure 2:
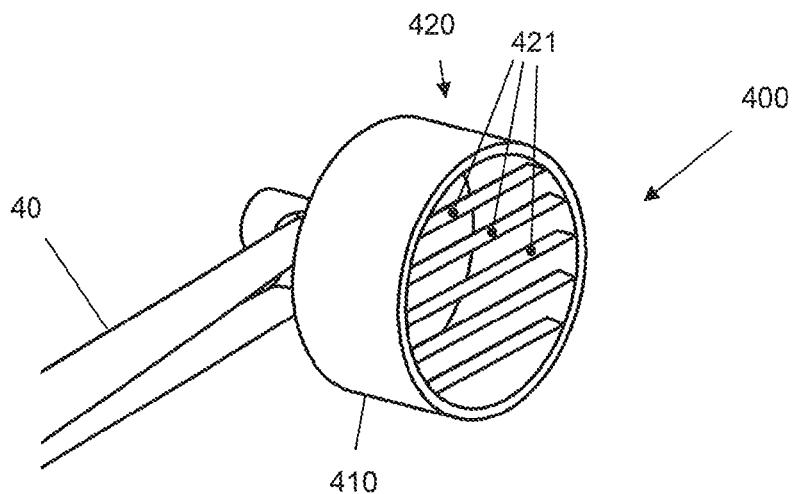
FIG. 2 is a schematic perspective view of a thrust unit.

FIG. 2 is a schematic perspective view of a thrust unit. By way of example, a side thrust unit 400 is depicted here and discussed below, but basically the same design considerations apply to the central thrust unit(s) as well. This also applies to FIGS. 3A-C which are schematic cross sections of a thrust unit.

For better guidance of air, it is preferred that a thrust unit 400 comprises a substantially cylindrical shroud 410 having an entrance opening 411 and an exit opening 412. Inside the shroud 410, a fan 430 is arranged, having a fan axle 431 substantially coaxial with the shroud 410. A set of fan blades 432 are mounted to the fan axle 431 at a certain axial position. The fan 430 may have a stack of two or more such sets at axial distance with respect to each other, as shown.

The fan 430 generates an air flow generally parallel to its axle 431, from entrance 411 to exit 412, confined and channeled by the shroud 410. It is a particular feature of the present invention that the thrust unit 400 at its exit 412 is provided with air flow deflection means 420, Such air flow deflection means 420 may for instance be implemented by an asymmetric exit opening 412, and/or a bend in the shroud. In a preferred embodiment, as shown, said air flow deflection means 420, hereinafter also indicated as air flow deflector 420, comprises a set of mutually parallel deflector strips 421 having a longitudinal direction crossing said exit opening 411, substantially perpendicular to the shroud axis. The deflector strips 421 are mounted tiltable, i.e. then can be tilted about their own longitudinal axes in either direction. For safety considerations, it is preferred that each deflector strip 421 is provided with an individual tilt actuator, which may for instance include a small electric motor or hydraulic control. It is also possible to arrange the deflector strips in groups, and to provide each group with a dedicated tilt actuator. Either way, a relatively simple and light-weight design results, with redundancy in the sense that one tilting strip, or one group of strips, may fail while the others continue to operate properly. Consequently, such failure results in only small loss of function and/or control.

Figure 3A:
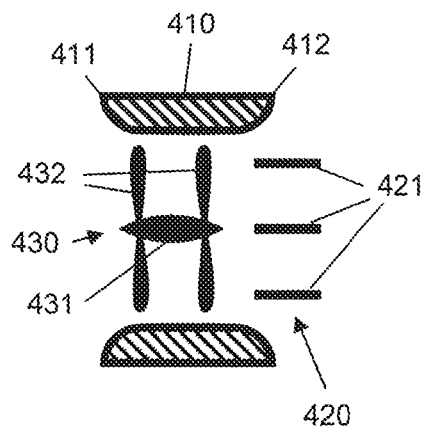
FIGS. 3A-3C are schematic cross sections of a side thrust unit to schematically illustrate the operation of a deflector.
Figure 3B:
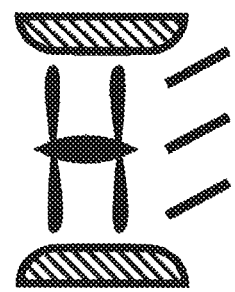
Figure 3C:
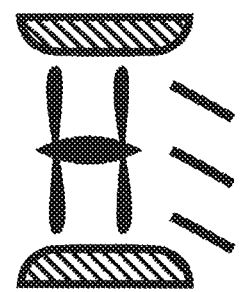

In a rest position, illustrated in FIG. 3A, the deflector strips 421 have their width direction arranged parallel to the fan axle 431 so as not to deflect air flowing out of the shroud 410. In a tilted position, illustrated in FIGS. 3B and 3C, the deflector strips 421 make an angle with respect to the fan axle 431 and hence they deflect air flowing out of the shroud 410, The flow deflector 420 has a horizontal operational position in which the deflector strips 421 have their longitudinal axes extend substantially horizontal. Then, in the case of FIG. 3B, air flow would be deflected up, exerting a reaction force down on the flow deflector 420, while in the case of FIG. 3C, air flow would be deflected down, exerting a reaction force up on the flow deflector 420.

It is possible that the flow deflector 420 is mounted to be as a whole rotatable with respect to the support 40, about a deflector axis parallel to or coinciding with the rotation axis of the fan axle 431. When the flow deflector 420 is rotated about its deflector axis, the deflected air obtains a horizontal flow component, thus exerting a reaction force with a horizontal force component. If the flow deflector 420 has a rotation range extending at least 90', it can reach a vertical operational position in which the deflector strips 421 extend in vertical direction so that, when tilted, they deflect the air flowing out of the shroud 410 in horizontal direction, towards or away from the midplane.

Figure 4:
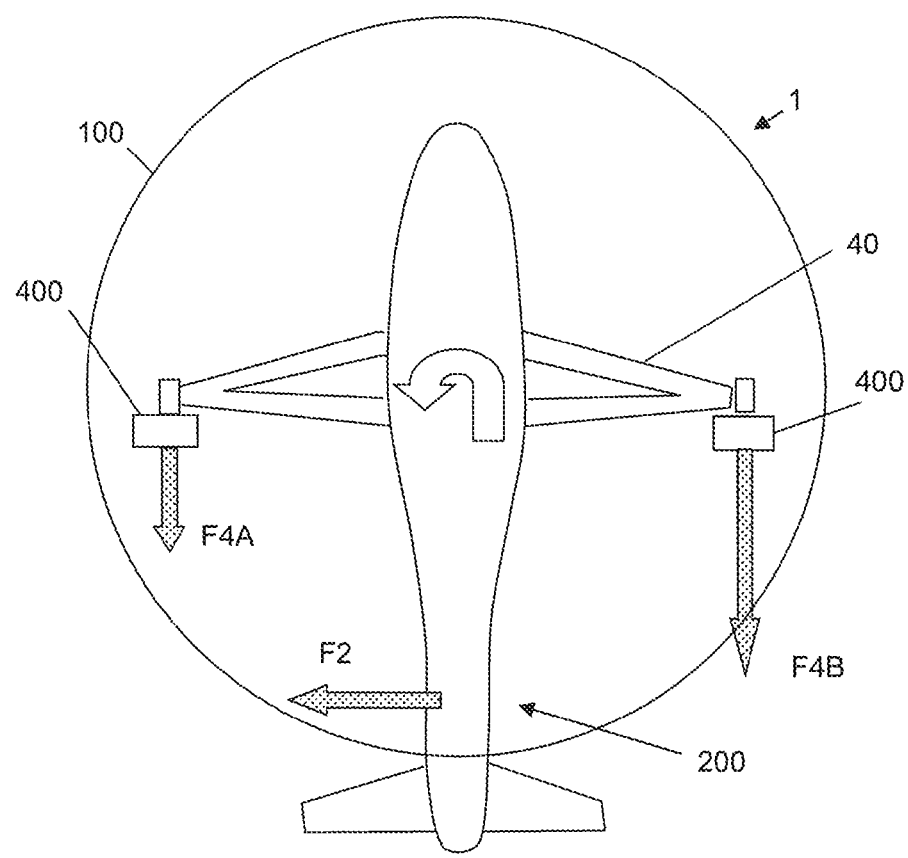
FIG. 4 illustrates counter-torque forces according to the present invention.

The thrust units 200, 400 have two important functions, as will be explained with reference to the schematic top view of FIG. 4.

One function is to counteract the reaction torque generated by the main rotor 100. To this end, the horizontal thrust is employed. Said function can be performed by the central thrust unit 200, which provides horizontal thrust in transverse direction, as indicated by arrow F2. Said function can also be performed by any one of the side thrust units 400 individually, which provides horizontal thrust in longitudinal direction, as indicated by arrows F4A and F4B. Thus, the system is redundant, which is an advantageous feature from safety perspective, because the anti-torque force to control the vehicle can still be provided if one or more of the thrust units fail.

A second function is to provide orientation control. Again, the horizontal thrust of the central thrust unit 200 and/or any one of the side thrust units 400 can be used for the purpose of providing yaw control. It is noted that the horizontal thrust of the side thrust units 400 can also be used to displace the vehicle in longitudinal direction. The air flow deflector(s) of the central thrust unit(s) 200 allow the central thrust unit(s) 200 to provide vertical thrust for pitch control. The air flow deflector(s) of the side thrust units 400 allow the side thrust units 400 to provide vertical thrust for roll control. The response by the vehicle to user input in this respect will be very fast.

In a further elaboration, the side thrust units 400 may be tiltable about a horizontal axis substantially perpendicular to the midplane, to contribute in providing lifting force, and/or to contribute in providing a pitch moment or a roll moment through direct fan power rather that through deflected air flow.

Proper control of the output provided by said thrust units 200, 400 will allow the vehicle for instance to be rotated about a vertical axis at a slow and controlled rate. Controlling the side thrust units 400 will allow the vehicle to travel forward. At the same time, anti-torque force can be provided by the central thrust unit 200 (see arrow F2 in FIG. 4), and/or by driving the side thrust units 400 at mutually different power (see arrows F4A and F4B in FIG. 4), In a further elaboration, it is possible that the central thrust unit(s) 200 are mounted within the tail section 20, and deflector blades are arranged at the entrance side as well as at the exit side of the units, i.e. at the righthand side as well as at the lefthand side of the fuselage. These deflector blades can act as shutters, i.e. they have a closed position in which they are substantially flush with the fuselage around the central thrust unit(s) 200. This is particularly useful during flight to reduce drag; the tail foils structure 30 can provide for pitch control and yaw control in such case, possibly in cooperation with the side thrust units 400.

While it is possible that the thrust units can be driven by a combustion engine, and the same applies to the main rotor, it is a specific feature of the present inventive vehicle that the thrust units and optionally the main rotor are driven by electric motors, which in turn may be powered from batteries, fuel cells, or even a combustion engine and/or a turbine driving a generator. Combinations of these power sources are also possible.

The use of electric motors allows for an important safety feature. Suppose that the power source fails, or runs out. Then the thrust units and the main rotor are no longer driven, and the vehicle will descend. The main rotor is able to operate in autorotation mode, which in any case will result in a substantial slowing of the descent. Further, the main rotor can in such case be set to drive a generator (which in the case of an electrically-driven main rotor can be its own electric motor operating in generating mode), so that the air-driven main rotor becomes a source of electric energy with which the electric thrust units can be driven to control the vehicle during descent.

It is an important aspect of the present invention that it allows for use of a simple main rotor. Thus, in a preferred embodiment, the main rotor has rotor blades which at all times mutually have the same pitch. In a possible embodiment, that pitch is even fixed. In another possible embodiment, that pitch is adjustable.

It should be clear to a person skilled in the art that the present invention is not limited to the exemplary embodiments discussed above, but that several variations and modifications are possible within the protective scope of the invention as defined in the appending claims. For instance, the thrust units may be provided with thrust reversal.

Further, the main rotor may be driven by two or more (electric) motors arranged in parallel. On the one hand, this allows the use of smaller motors to provide the required power. On the other hand, this results in redundancy: if one motor fails, the remaining motors will be able to keep the rotor running. A motor may also consist of several independent sections to provide redundancy.

Further, to increase redundancy, thrust units may be provided double or more.

Further, it is possible that the axis of the main rotor is tilted slightly to the rear and slightly to a side, to compensate some of the thrust provided by the thrust units during take-off.

Even if certain features are recited in different dependent claims, the present invention also relates to an embodiment comprising these features in common.

Even if certain features have been described in combination with each other, the present invention also relates to an embodiment in which one or more of these features are omitted.

Features which have not been explicitly described as being essential may also be omitted.

Any reference signs in a claim should not be construed as limiting the scope of that claim.

The invention claimed is:

1. A vehicle capable of flying in air and operating in a first modus providing yaw control and in a second modus providing roll control, the vehicle comprising:
   a body having a tail section;
   a main rotor having a rotation axis on top of the body;
   at least one mounting support on either side of the body; and
   thrust units:
      at least one of the thrust units comprising a central thrust unit arranged along a longitudinal axis of the vehicle, at a distance from the rotation axis of the main rotor; and
      at least two of the thrust units comprising a pair of side thrust units mounted one each to each mounting support;
   wherein each central thrust unit comprises:
      a fan which provides output air flow with a main central flow component in a main central flow direction substantially perpendicular to a virtual vertical midplane of the vehicle;
   wherein at least one central thrust unit further comprises:
      a controllable central air deflection device to deflect the main central flow component of the output air flow in a controllable manner into a controlled central flow component in a direction perpendicular to the main central flow direction;
   wherein each side thrust unit comprises:
      a fan which provides output air flow with a main side flow component in a main side flow direction substantially parallel to the virtual vertical midplane and in a substantially horizontal direction;
   wherein at least one of the side thrust units further comprises:
      a controllable side air deflection device:
      to deflect the main side flow component of the output air flow in a controllable manner into a controlled side flow component in a direction perpendicular to the main side flow direction;
      mounted to be rotatable about an axis parallel to the main side flow direction;
      having at least one first rotation position in which the controlled side flow component has a substantially horizontal component; and
      having at least one second rotation position in which the controlled side flow component has a substantially vertical component;
   wherein, operating in the first modus, at least one controllable side air deflection device is in one of the at least one first rotation position to provide the yaw control; and
   wherein, operating in the second modus, at least one controllable side air deflection device is in one of the at least one second rotation position to provide the roll control.

* * * * *